United States Patent
He et al.

(10) Patent No.: US 11,221,425 B1
(45) Date of Patent: Jan. 11, 2022

(54) GENERATING A MODEL FOR SEISMIC VELOCITIES IN A SUBSURFACE REGION USING INVERSION WITH LATERAL VARIATIONS

(71) Applicant: Saudi Arabian Oil Company, Dhahran (SA)

(72) Inventors: Yi He, Beijing (CN); Tong Wang Fei, Dhahran (SA); Young Seo Kim, Abqaiq (SA)

(73) Assignee: Saudi Arabian Oil Company, Dhahran (SA)

( * ) Notice: Subject to any disclaimer, the term of this patent is extended or adjusted under 35 U.S.C. 154(b) by 0 days.

(21) Appl. No.: 16/923,870

(22) Filed: Jul. 8, 2020

(51) Int. Cl.
*G01V 1/28* (2006.01)
*G01V 1/30* (2006.01)

(52) U.S. Cl.
CPC .............. *G01V 1/282* (2013.01); *G01V 1/302* (2013.01); *G01V 1/305* (2013.01); *G01V 1/308* (2013.01)

(58) Field of Classification Search
CPC ........ G01V 1/282; G01V 1/302; G01V 1/308; G01V 1/305
See application file for complete search history.

(56) References Cited

U.S. PATENT DOCUMENTS

| | | | | |
|---|---|---|---|---|
| 4,813,027 A * | 3/1989 | Tieman | ................... | G01V 1/362 367/52 |
| 5,500,832 A * | 3/1996 | Berryhill | ................ | G01V 1/301 367/50 |
| 5,570,321 A * | 10/1996 | Bernitsas | ................ | G01V 1/282 367/38 |
| 6,868,039 B2 | 3/2005 | Broto | | |
| 9,477,001 B2 | 10/2016 | Van Groenestijn | | |
| 10,054,714 B2 * | 8/2018 | Denli | ....................... | G01V 1/282 |
| 10,067,255 B2 | 9/2018 | Colombo et al. | | |
| 10,451,765 B2 | 10/2019 | Wessling et al. | | |
| 2007/0032955 A1 * | 2/2007 | Williams | ................ | G01V 1/282 702/14 |
| 2011/0096626 A1 | 4/2011 | Zhu et al. | | |
| 2016/0187512 A1 | 6/2016 | Mothi et al. | | |

(Continued)

OTHER PUBLICATIONS

Baerg, "Traveltime in media with linear velocity-depth functions," CREWES Research Reports, 461-466, 1991, 6 pages.

(Continued)

*Primary Examiner* — Mischita L Henson
(74) *Attorney, Agent, or Firm* — Fish & Richardson P.C.

(57) ABSTRACT

A method for building a three dimensional (3D) model of a subsurface formation includes selecting, from a set of seismic shots, a plurality of first arrival signals representing the seismic shots. The method includes applying a quality control function to the plurality of first arrival signals to obtain a set of remaining first arrival signals. For each remaining first arrival signals, the method includes applying a velocity inversion function to obtain a depth velocity value at a common-midpoint (CMP) location in a shot gather including the seismic shot associated with that remaining first arrival signal, the CMP location representing a lateral variation of the shot gather including that seismic shot. The method includes, based on the depth velocity value for the seismic shot associated with each remaining first arrival signal, generating a velocity model representing the 3D model of the subsurface formation.

20 Claims, 13 Drawing Sheets

(56) References Cited

U.S. PATENT DOCUMENTS

| | | | | |
|---|---|---|---|---|
| 2016/0202371 | A1* | 7/2016 | Li | G01V 1/305 |
| | | | | 367/26 |
| 2019/0094399 | A1* | 3/2019 | Yilmaz | G01V 1/345 |
| 2019/0302298 | A1 | 10/2019 | Colombo et al. | |
| 2019/0324167 | A1* | 10/2019 | Zhang | G06F 17/18 |
| 2020/0003920 | A1* | 1/2020 | Tang | G01V 1/282 |

OTHER PUBLICATIONS

Bohlen et al., "L5D inversion of lateral variation of Scholte-wave dispersion," Geophysics, vol. 69, No. 2, Mar.-Apr. 2004, 15 pages.

Colombo et al., "Fully automated near-surface analysis by surface-consistent refraction method," Geophysics, 81, No. 4, U39-U49, https://doi.org/10.1190/geo2016-0018.1, Jul.-Aug. 2016, 11 pages.

Colombo et al., "pQC: A novel approach for robust automatic near-surface analysis in low-relief geology," The Leading Edge, 35, 952-960, https://doi.org/10.1190/tle35110952.1, Nov. 2016, 9 pages.

Diaferia, "Modeling and inversion of Scholte waves in shallow water for varying acquisition parameters," Delft University of Technology, Faculty of Civil Engineering and Geoscience, Joint Master of Science in Applied Geophysics, Aug. 2012, 59 pages.

Gisolf et al., "Reservoir-oriented wave-equation-based seismic amplitude variation with offset inversion," Special section: Seismic inversion, Interpretation, Aug. 2017, 14 pages.

Hart, "Improving the reliability of first break picking with neural networks," 66th Annual International Meeting, SEG, Expanded Abstracts, 1662-1665, 1996, 4 pages.

Keho, "Revisiting automatic first arrival picking for large 3D land surveys," SEG Houston 2009 International Exposition and Annual Meeting, 79th Annual International Meeting, SEG, Expanded Abstracts, 3198-3202, 2009, 5 pages.

Kugler et al., "Scholte-wave tomography for shallow-water marine sediments," Geophys. J. Int. vol. 168, 551-570, 2007, 20 pages.

Sabbione et al., "Automatic first-breaks picking: new strategies and algorithms," Geophysics, 75, No. 4, V67-V76, Jul.-Aug. 2010, 10 pages.

Luo et al., "Wave-equation traveltime inversion." Geophysics 56.5, May 1991, 645-653, 9 pages.

PCT International Search Report and Written Opinion in International Appln. No. PCT/US2021/040828, dated Oct. 19, 2021, 18 pages.

* cited by examiner

GENERATING A MODEL FOR SEISMIC VELOCITIES IN A SUBSURFACE REGION USING INVERSION WITH LATERAL VARIATIONS

TECHNICAL FIELD

The present disclosure generally relates to an approach for modeling geologic features in a subsurface formation, particularly for generating a model of seismic velocities associated with the formation.

BACKGROUND

In geology, sedimentary facies are bodies of sediment that are recognizably distinct from adjacent sediments that resulted from different depositional environments. Generally, geologists distinguish facies by aspects of the rock or sediment being studied. Seismic facies are groups of seismic reflections whose parameters (such as amplitude, continuity, reflection geometry, and frequency) differ from those of adjacent groups. Seismic facies analysis, a subdivision of seismic stratigraphy, plays an important role in hydrocarbon exploration and is one key step in the interpretation of seismic data for reservoir characterization. The seismic facies in a given geological area can provide useful information, particularly about the types of sedimentary deposits and the anticipated lithology.

In reflection seismology, geologists and geophysicists perform seismic surveys to map and interpret sedimentary facies and other geologic features, for example, identification of potential petroleum reservoirs. Seismic surveys are conducted by using a controlled seismic source (for example, a seismic vibrator or dynamite) to create a seismic wave. The seismic source is typically located at ground surface. The seismic wave travels into the ground, is reflected by subsurface formations, and returns to the surface where it is recorded by sensors called geophones. The geologists and geophysicists analyze the time it takes for the seismic waves to reflect off subsurface formations and return to the surface to map sedimentary facies and other geologic features. This analysis can also incorporate data from sources, for example, borehole logging, gravity surveys, and magnetic surveys.

Geological and reservoir models based the results of this analysis are used in exploration, development and production project planning. In particular, velocity modeling can be used to integrate measured seismic velocities, depth imaged seismic data, well velocity information and interpreted structural information into a calibrated velocity model reflecting subsurface formations.

SUMMARY

Generally, reliable models of seismic velocities in near surface are important for geophysical studies. The systems and processes of this specification include an automatic approach for building three dimensional (3D) velocity structures (also called velocity models) of shallow sections of a reservoir from the lateral variation of seismic first arrivals (also called first-break picking). In seismology, first-break picking generally is the detecting or picking the onset arrivals of refracted signals from all the signals received by receiver arrays and produced by a particular source signal generation. It is also called first break detection. First arrivals are generally picked by a fine-tuned auto-picker process. A four dimensional (4D) median filter is configured to move along the picks to remove outliers. The remaining picks in a common shot domain are inverted for the velocity depth profile. As the shot location continuously moves, a 3D velocity section based on common-midpoint (CMP) locations is generated with the offset-weighted technique of one and a half dimension (1.5D) inversion. In multichannel seismic acquisition, CMP locations include a point on the surface halfway between the source and receiver that is shared by numerous source-receiver pairs. Such redundancy among source-receiver pairs enhances the quality of seismic data when the data are stacked. Generally, the common midpoint is vertically above the common depth point, or common reflection point. In this disclosure, a two dimensional (2D) land seismic dataset is used to demonstrate the workflow of the invention and show the practical applications of the disclosed method in near surface seismic velocity model building process.

The objective of 1.5D inversion of lateral variation in seismic velocity model building is to obtain the 3D velocity structure of shallow sections of a reservoir from the lateral variation of seismic first arrivals. The resulting velocity can be utilized for correcting datum statics and producing a migration seismic image, or as the starting model in waveform inversion for imaging the detailed geological structures.

In a general aspect, a process for building a three dimensional (3D) model of a subsurface formation includes selecting, from a set of seismic shots, a plurality of first arrival signals representing the seismic shots. The process includes applying a quality control function to the plurality of first arrival signals to obtain a set of remaining first arrival signals. The process includes, for each remaining first arrival signals, applying a velocity inversion function to obtain a depth velocity value at a common-midpoint (CMP) location in a shot gather including the seismic shot associated with that remaining first arrival signal, the CMP location representing a lateral variation of the shot gather including that seismic shot. The process includes, based on the depth velocity value for the seismic shot associated with each remaining first arrival signal, generating a velocity model representing the 3D model of the subsurface formation.

In some implementations, selecting the plurality of first arrival signals includes determining, for each first arrival signal of the plurality of first arrival signals, an energy ratio value. In some implementations, selecting the plurality of first arrival signals includes determining a particular energy ratio value that is a global maximum energy ratio value. In some implementations, selecting the plurality of first arrival signals includes selecting a first arrival signal associated with the global maximum energy ratio value.

In some implementations, applying the quality control function includes sorting the plurality of first arrival signals representing the seismic shots in a four dimensional (4D) domain. In some implementations, applying the quality control function includes, for each first arrival signal: applying a hypercube window centered on that first arrival signal to extract other first arrival signals in the 4D domain, the other first arrival signals being inside the hypercube window; determining a median value of the first arrival signal and the other first arrival signal; and storing the median value for representing the first arrival signal.

In some implementations, the velocity inversion function is applied to at least two first arrival signals of the plurality of first arrival signals in parallel. In some implementations, a processing time for parallel processing of the velocity inversion function is reduced by at least 90% relative to a processing time for non-parallel processing of the velocity inversion function.

In some implementations, applying the velocity inversion function further includes applying a weighting function to each remaining first arrival signal representing a contribution of that remaining first arrival signal to the CMP location.

In some implementations, the process includes, based on the velocity model representing the 3D model of the subsurface formation, performing datum statics correction for the shot gather. The process includes, based on the datum statics correction, performing a normal moveout (NMO) stacking for the shot gather.

In a general aspect, a system for building a three dimensional (3D) model of a subsurface formation includes at least one processing device and a memory storing instructions that when executed by the at least one processing device cause the at least one processing device to perform the following operations. The operations include selecting, from a set of seismic shots, a plurality of first arrival signals representing the seismic shots. The operations include applying a quality control function to the plurality of first arrival signals to obtain a set of remaining first arrival signals. The operations include, for each remaining first arrival signals, applying a velocity inversion function to obtain a depth velocity value at a common-midpoint (CMP) location in a shot gather including the seismic shot associated with that remaining first arrival signal, the CMP location representing a lateral variation of the shot gather including that seismic shot. The operations include, based on the depth velocity value for the seismic shot associated with each remaining first arrival signal, generating a velocity model representing the 3D model of the subsurface formation.

In some implementations, selecting the plurality of first arrival signals includes determining, for each first arrival signal of the plurality of first arrival signals, an energy ratio value. In some implementations, selecting the plurality of first arrival signals includes determining a particular energy ratio value that is a global maximum energy ratio value. In some implementations, selecting the plurality of first arrival signals includes selecting a first arrival signal associated with the global maximum energy ratio value.

In some implementations, applying the quality control function includes sorting the plurality of first arrival signals representing the seismic shots in a four dimensional (4D) domain. In some implementations, applying the quality control function includes, for each first arrival signal: applying a hypercube window centered on that first arrival signal to extract other first arrival signals in the 4D domain, the other first arrival signals being inside the hypercube window; determining a median value of the first arrival signal and the other first arrival signal; and storing the median value for representing the first arrival signal.

In some implementations, the velocity inversion function is applied to at least two first arrival signals of the plurality of first arrival signals in parallel. In some implementations, a processing time for parallel processing of the velocity inversion function is reduced by at least 90% relative to a processing time for non-parallel processing of the velocity inversion function.

In some implementations, applying the velocity inversion function further includes applying a weighting function to each remaining first arrival signal representing a contribution of that remaining first arrival signal to the CMP location.

In some implementations, the operations include, based on the velocity model representing the 3D model of the subsurface formation, performing datum statics correction for the shot gather. The operations include, based on the datum statics correction, performing a normal moveout (NMO) stacking for the shot gather.

In a general aspect, one or more non-transitory computer readable media store instructions for building a three dimensional (3D) model of a subsurface formation. The instructions are configured for execution by at least one processing device to cause the at least one processing device to perform the following operations. The operations include selecting, from a set of seismic shots, a plurality of first arrival signals representing the seismic shots. The operations include applying a quality control function to the plurality of first arrival signals to obtain a set of remaining first arrival signals. The operations include, for each remaining first arrival signals, applying a velocity inversion function to obtain a depth velocity value at a common-midpoint (CMP) location in a shot gather including the seismic shot associated with that remaining first arrival signal, the CMP location representing a lateral variation of the shot gather including that seismic shot. The operations include, based on the depth velocity value for the seismic shot associated with each remaining first arrival signal, generating a velocity model representing the 3D model of the subsurface formation.

In some implementations, selecting the plurality of first arrival signals includes determining, for each first arrival signal of the plurality of first arrival signals, an energy ratio value. In some implementations, selecting the plurality of first arrival signals includes determining a particular energy ratio value that is a global maximum energy ratio value. In some implementations, selecting the plurality of first arrival signals includes selecting a first arrival signal associated with the global maximum energy ratio value.

In some implementations, applying the quality control function includes sorting the plurality of first arrival signals representing the seismic shots in a four dimensional (4D) domain. In some implementations, applying the quality control function includes, for each first arrival signal: applying a hypercube window centered on that first arrival signal to extract other first arrival signals in the 4D domain, the other first arrival signals being inside the hypercube window; determining a median value of the first arrival signal and the other first arrival signal; and storing the median value for representing the first arrival signal.

In some implementations, the velocity inversion function is applied to at least two first arrival signals of the plurality of first arrival signals in parallel. In some implementations, a processing time for parallel processing of the velocity inversion function is reduced by at least 90% relative to a processing time for non-parallel processing of the velocity inversion function.

In some implementations, applying the velocity inversion function further includes applying a weighting function to each remaining first arrival signal representing a contribution of that remaining first arrival signal to the CMP location.

In some implementations, the operations include, based on the velocity model representing the 3D model of the subsurface formation, performing datum statics correction for the shot gather. The operations include, based on the datum statics correction, performing a normal moveout (NMO) stacking for the shot gather.

The approaches subsequently described include one or more of the following advantages. The 4D median filter removes outliers of the seismic shot data. The process includes the 1.5D velocity inversion that is well suited for handling first arrival picks of very large 3D seismic data sets and for taking advantage of current supercomputers. For example, the process subsequently described can be run on multi-core/multi-node computers with parallelization. Processing in this way is suitable for large 3D seismic datasets. For example, the runtime of the approach on one graphical processing unit (GPU) is about 10~20 times faster than conventional flows. Additionally, the process can be fully automated in the whole processing flow. This is in contrast to alternatives that are mostly human-interactive approaches whose cost is proportional to the size of input data, and which require manpower-intensive analysis.

The details of one or more embodiments of these systems and methods are set forth in the accompanying drawings and the description below. Other features and advantages of these system and methods will be apparent from the description and drawings, and from the claims.

DETAILED DESCRIPTION

The systems and processes of this specification include an automatic approach of building 3D velocity structures (also called velocity models) of shallow sections from the lateral variation of seismic first arrivals. Generally, first arrivals are picked by a fine-tuned auto-picker process. A 4D median filter is configured to move along the picks to remove the outliers. The remaining picks in a common shot domain are inverted for the velocity depth profile. As the shot location continuously moves, a 3D velocity section based on CMP locations is generated with the offset-weighted technique of 1.5D inversion. In this disclosure, 2D land seismic dataset is used to demonstrate the process and system for generating a model for seismic velocities in a subsurface region using 1.5D velocity inversion with lateral variations and show the practical applications of the disclosed method in near surface seismic velocity model building process.

Figure 1:
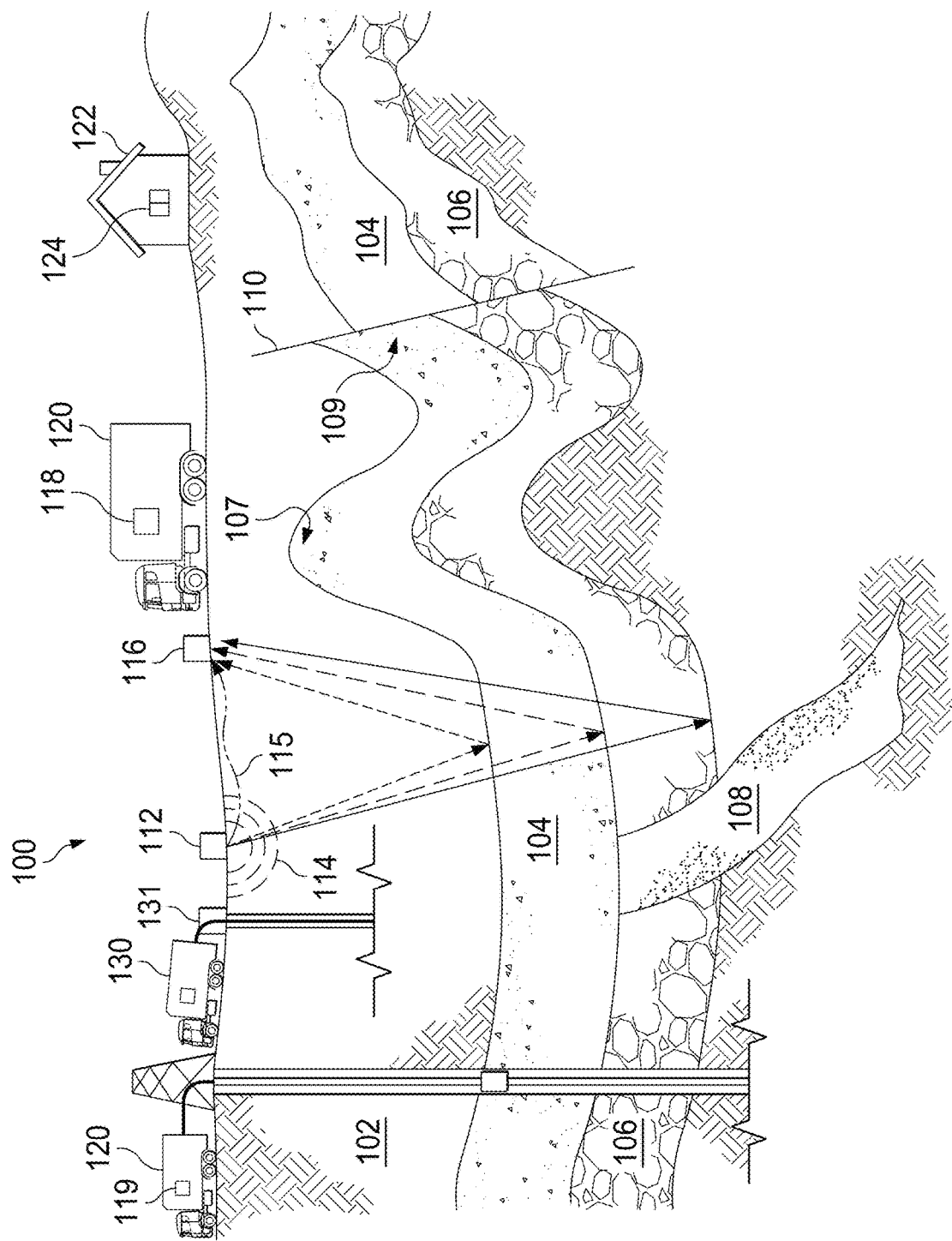
FIG. 1 is a schematic view of a seismic survey being performed to map subterranean features such as facies and faults.

FIG. 1 is a schematic view of a seismic survey being performed to map subterranean features such as facies and faults in a subterranean formation 100. The subterranean formation 100 includes a layer of impermeable cap rock 102 at the surface with multiple underlying layers 104, 106, and 108. A fault line 110 extends across two of the layers 104, 106.

Oil and gas tend to rise through permeable reservoir rock until further upward migration is blocked, for example, by the layer of impermeable cap rock 102. Seismic surveys attempt to identify locations where interaction between layers of the subterranean formation 100 are likely to trap oil and gas by limiting this upward migration. For example, FIG. 1 shows an anticline trap 107, where the layer of impermeable cap rock 102 has an upward convex configuration, and a fault trap 109, where the fault line 110 might allow oil and gas to flow in with clay material between the walls traps the petroleum. Other traps include salt domes and stratigraphic traps.

A seismic source 112 (for example, a seismic vibrator or an explosion) generates seismic waves that propagate in the earth. Although illustrated as a single component in FIG. 1, the source or sources 112 are typically a line or an array of sources 112. The generated seismic waves include seismic body waves 114 that travel into the ground and seismic surface waves 115 travel along the ground surface and diminish as they get further from the surface.

The velocity of these seismic waves depends properties, for example, density, porosity, and fluid content of the medium through which the seismic waves are traveling. Different geologic bodies or layers in the earth are distinguishable because the layers have different properties and, thus, different characteristic seismic velocities. For example, in the subterranean formation 100, the velocity of seismic waves traveling through the subterranean formation 100 will be different in the different layers 104, 106, and 108. As the seismic body waves 114 contact interfaces between geologic bodies or layers that have different velocities, each interface reflects some of the energy of the seismic wave and refracts some of the energy of the seismic wave. Such interfaces are sometimes referred to as horizons.

The seismic body waves 114 are received by a sensor or sensors 116. Although illustrated as a single component in FIG. 1, the sensor or sensors 116 are typically a line or an array of sensors 116 that generate an output signal in response to received seismic waves including waves reflected by the horizons in the subterranean formation 100. The sensors 116 can be geophone-receivers that produce electrical output signals transmitted as input data, for example, to a computer 118 on a seismic control truck 120. Based on the input data, the computer 118 may generate a seismic data output, for example, a seismic two-way response time plot.

The seismic surface waves 115 travel more slowly than seismic body waves 114. Analysis of the time it takes seismic surface waves 115 to travel from source to sensor can provide information about near surface features.

A control center 122 can be operatively coupled to the seismic control truck 120 and other data acquisition and wellsite systems. The control center 122 may have computer facilities for receiving, storing, processing, and analyzing data from the seismic control truck 120 and other data acquisition and wellsite systems. For example, computer systems 124 in the control center 122 can be configured to analyze, model, control, optimize, or perform management tasks of field operations associated with development and production of resources such as oil and gas from the subterranean formation 100. Alternatively, the computer systems 124 can be located in a different location than the control center 122. Some computer systems are provided with functionality for manipulating and analyzing the data, such as performing seismic interpretation or borehole resistivity image log interpretation to identify geological surfaces in the subterranean formation or performing simulation, planning, and optimization of production operations of the wellsite systems.

In some implementations, results generated by the computer systems 124 may be displayed for user viewing using local or remote monitors or other display units. One approach to analyzing seismic data is to associate the data with portions of a seismic cube representing represent the subterranean formation 100. The seismic cube can also be display results of the analysis of the seismic data associated with the seismic survey.

Seismic surveys can be computationally and resource intensive, and establishing conventional wells can be very costly in terms of money, time, and resources. Therefore, it may be beneficial to obtain information related to the quality and type of oil before conducting a seismic survey and establishing a conventional well. The systems and method described in this specification can facilitate decisions as to whether to perform the seismic survey, whether to establish the conventional well, and the type of extraction techniques the conventional well will need to perform according to the type of oil to be extracted. In the illustrated implementation, a portable well truck 130 is used to place a portable drilling system 131 (for example, a portable drilling rig). The portable drilling system 131 is used to drill a relatively small borehole (relative to a conventional well) to obtain core samples, in which some of the core samples can be stained with oil. The core samples can be analyzed using the methods and systems discussed later in this specification to determine an API value of the oil at the borehole location. The information regarding the API value can be used to inform drilling decisions and whether to apply methods for enhancing oil recovery of heavy hydrocarbons, among others. Although, in the illustrated implementation, the portable drilling system 131 is used to drill a small borehole proximate to the illustrated location of the conventional well, in some implementations, the portable drilling system 131 drills a borehole at the location that the conventional well will be established, if it is decided to establish the conventional well.

Figure 2:
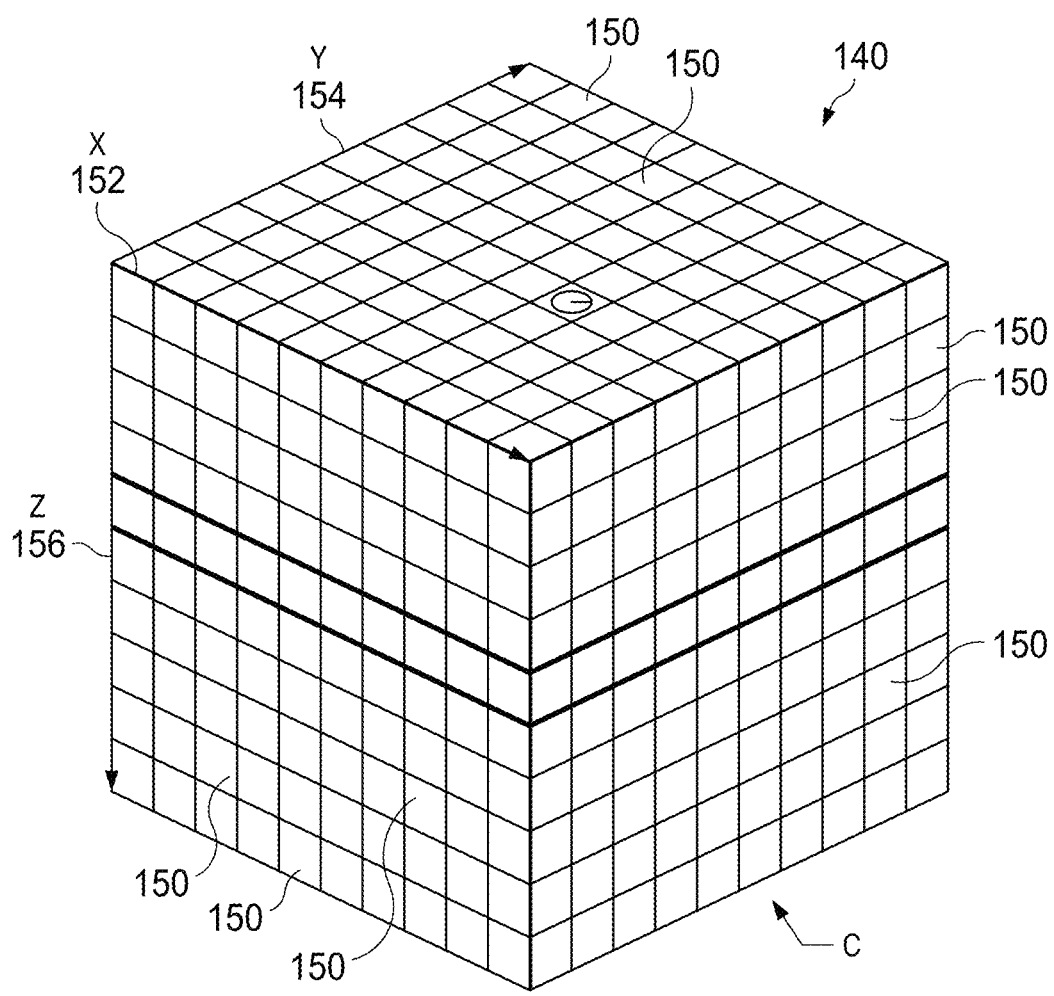
FIG. 2 illustrates a three-dimensional cube representing a subterranean formation.

FIG. 2 illustrates a seismic cube 140 representing at least a portion of the subterranean formation 100. The seismic cube 140 is composed of a number of voxels 150. A voxel is a volume element, and each voxel corresponds, for example, with a seismic sample along a seismic trace. The cubic volume C is composed along intersection axes of offset spacing times based on a delta-X offset spacing 152, a delta-Y offset spacing 154, and a delta-Z offset spacing 156. Within each voxel 150, statistical analysis can be performed on data assigned to that voxel to determine, for example, multimodal distributions of travel times and derive robust travel time estimates (according to mean, median, mode, standard deviation, kurtosis, and other suitable statistical accuracy analytical measures) related to azimuthal sectors allocated to the voxel 150.

Figure 3:
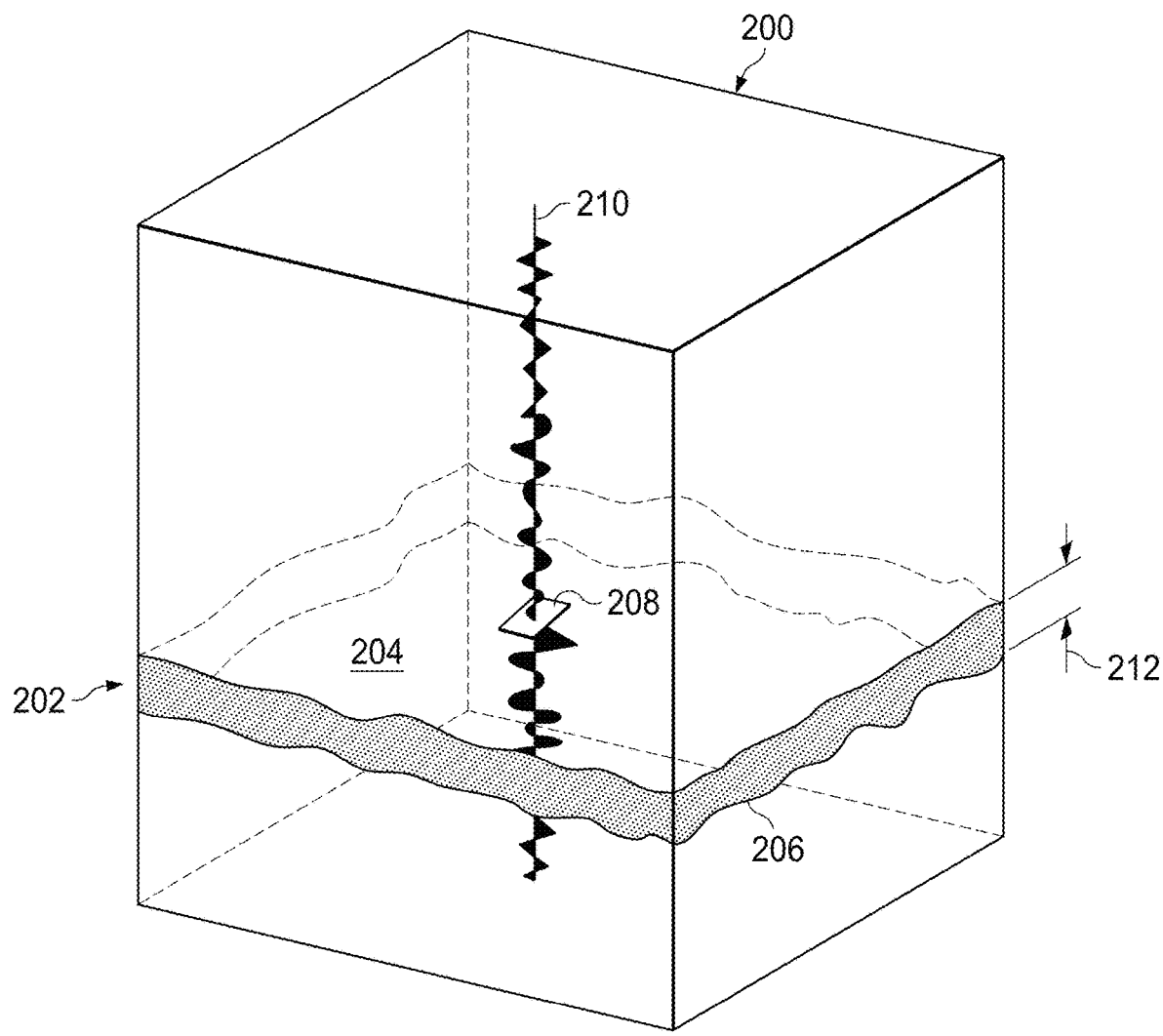
FIG. 3 illustrates a stratigraphic trace within the three-dimensional cube of FIG. 2.

FIG. 3 illustrates a seismic cube 200 representing a formation. The seismic cube has a stratum 202 based on a surface (for example, amplitude surface 204) and a stratigraphic horizon 206. The amplitude surface 204 and the stratigraphic horizon 206 are grids that include many cells such as exemplary cell 208. Each cell is a seismic trace representing an acoustic wave. Each seismic trace has an x-coordinate and a y-coordinate, and each data point of the trace corresponds to a certain seismic travel time or depth (t or z). For the stratigraphic horizon 206, a time value is determined and then assigned to the cells from the stratum 202. For the amplitude surface 204, the amplitude value of the seismic trace at the time of the corresponding horizon is assigned to the cell. This assignment process is repeated for all of the cells on this horizon to generate the amplitude surface 204 for the stratum 202. In some instances, the amplitude values of the seismic trace 210 within window 212 by horizon 206 are combined to generate a compound amplitude value for stratum 202. In these instances, the compound amplitude value can be the arithmetic mean of the positive amplitudes within the duration of the window, multiplied by the number of seismic samples in the window.

Figure 4A:
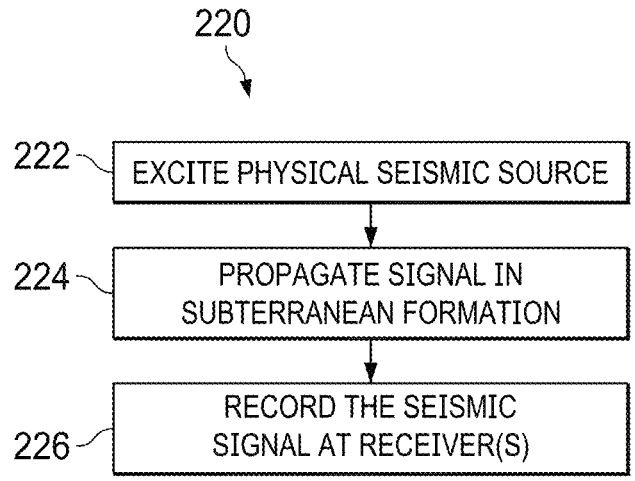
FIGS. 4A-4C illustrate flow diagrams including example processes for generating a model for seismic velocities in a subsurface region using 1.5D velocity inversion with lateral variations.
Figure 4B:
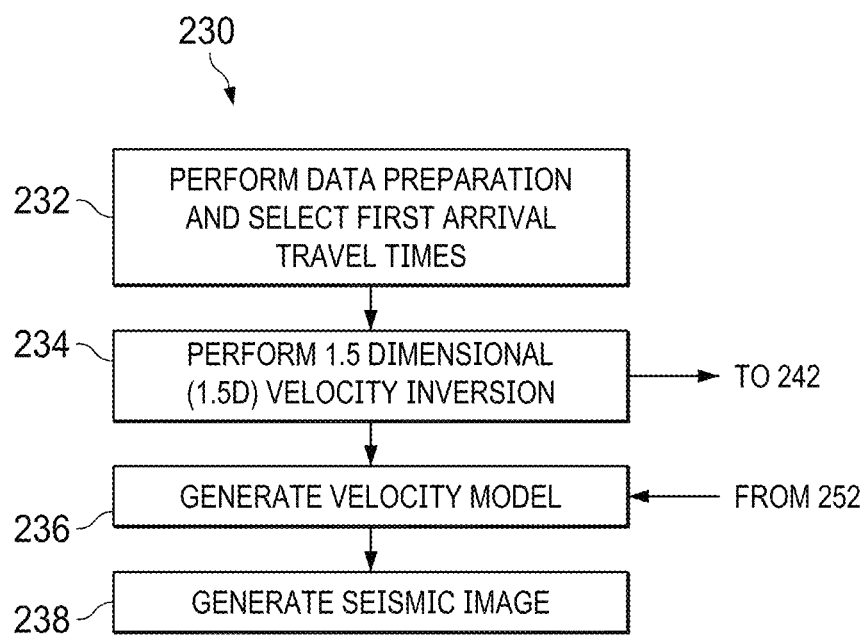
Figure 4C:
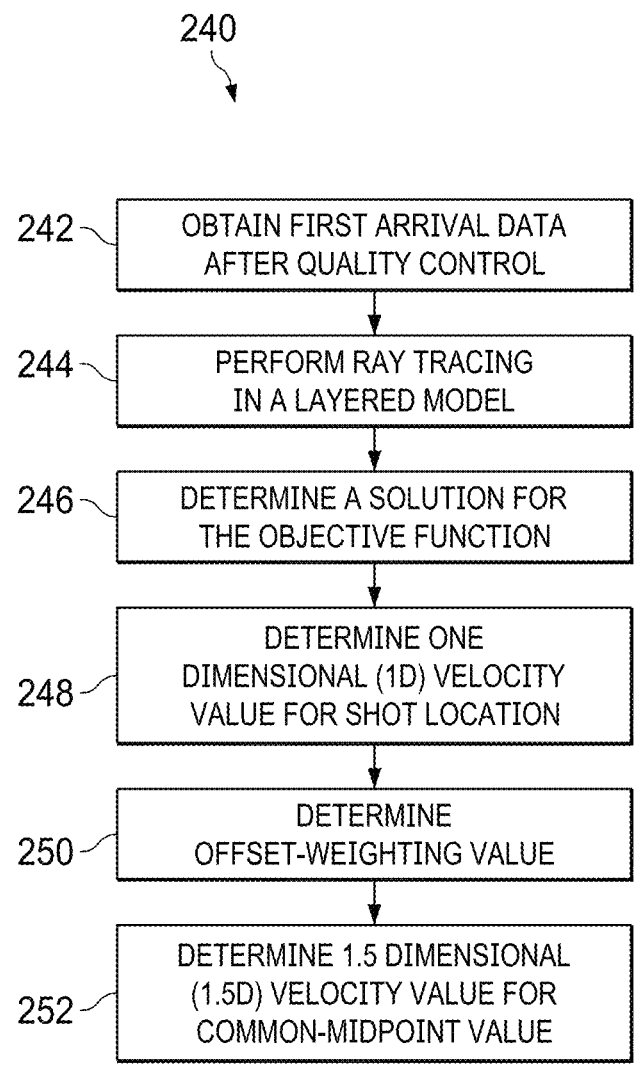
Figure 5:
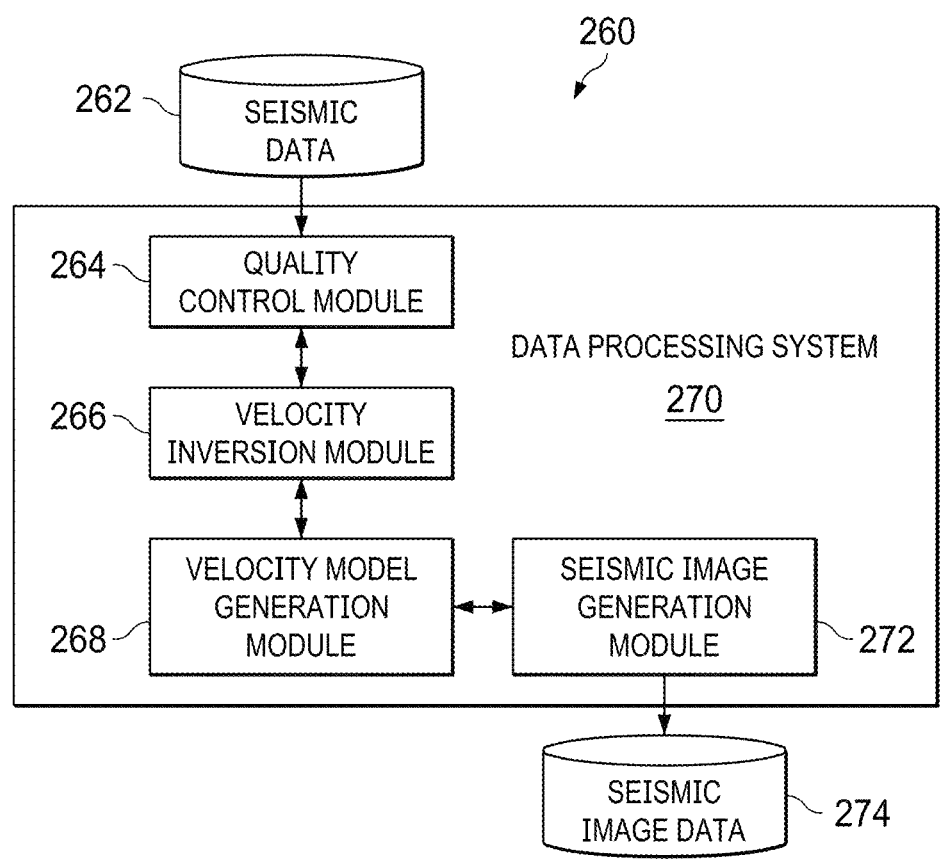
FIG. 5 shows a data processing system generating a model for seismic velocities in a subsurface region using 1.5D velocity inversion with lateral variations.

FIGS. 4A-4C illustrate flow diagrams including example processes 220, 230, and 240, respectfully, for generating a model for seismic velocities in a subsurface region using inversion with lateral variations. FIG. 5 shows a system 260 for generating a model of seismic velocities in a subsurface region using inversion with lateral variations by processes of FIGS. 4A-4C.

FIG. 4A shows a process 214 performed by a physical acquisition system (such as a part of the system described in relation to FIG. 1) is shown. One or more sources (such as source 112 of FIG. 1) are excited (222) to generate a seismic signal in the formation 100. The seismic signal is propagated (224) through subterranean formation 100 and recorded (226) at receiver(s) (such as sensors 116 of FIG. 1).

FIG. 4B shows a process 230 for generating a model for seismic velocities in a subsurface region using inversion with lateral variations. More specifically, process 230 includes performing a 1.5D velocity inversion to generate a 3D velocity model of the subsurface. The 3D model is used by a processing system (e.g. data processing system 270 of FIG. 5) to generate seismic images of the subsurface.

The process 230 for generating the velocity model has three main steps that are performed before the seismic images are generated. First, the data processing system 270 performs data preparation (232). This can include a quality control (QC) process, as subsequently described, performed by quality control module 264 of the data processing system 270. Generally, data preparation precedes the 1.5D velocity inversion and is configured to select first arrival travel times of the seismic data and provide high quality of input data. The data processing system 270 then performs a 1.5D velocity inversion (234), such as using velocity inversion module 266. The 1.5D velocity inversion stage includes performing, by the data processing system 270, a layer-based offset-weighted inversion with the selected first arrival travel times of the seismic data. The outcome of this process is a near-surface velocity model which reflects the distribution of seismic velocities under the ground. The process 230 includes generating the 3D velocity model (236) after the 1.5D velocity inversion process 240 of FIG. 4C is performed. Once the velocity model is generated, the data processing system 270 can generate seismic images (238) from the 3D velocity model.

For performing the quality control, particular seismic first arrivals of seismic data 262 (e.g., seismic shots) are chosen to generate an inverted velocity model. Generally, energy ratios can be calculated by the data processing system 270 to determine which seismic first arrivals are selected for further processing. In some implementations, machine learning approaches can be used. For example, neural networks, support vector machines, etc. can categorize the seismic data 262 to select which data represent first arrival travel times based on features of the seismic data, including energy ratios of the seismic data and other features of the seismic data. In an example, the data processing system 270 executes a global maximum energy method to determine first arrival travel times automatically. The data processing system 270 can use the quality control module 264 to perform this determination. In some implementations, the module is fine-tuned, such as with training data, to select the appropriate first arrival travel times from the seismic data 262.

The QC module 264 is further configured to perform quality control analysis on the selected first arrival travel times from the seismic data 262. For example, quality control is performed because influence of near-surface weathering layers and igneous rocks on the top surface can distort the seismic data 262. For example, the lower signal-to-noise ratio (S/N) of Vibroseis data commonly acquired in sandy overburden regions can introduce challenges to auto-picking first arrival travel times from the seismic data 262 for near-surface processing.

Figure 6:
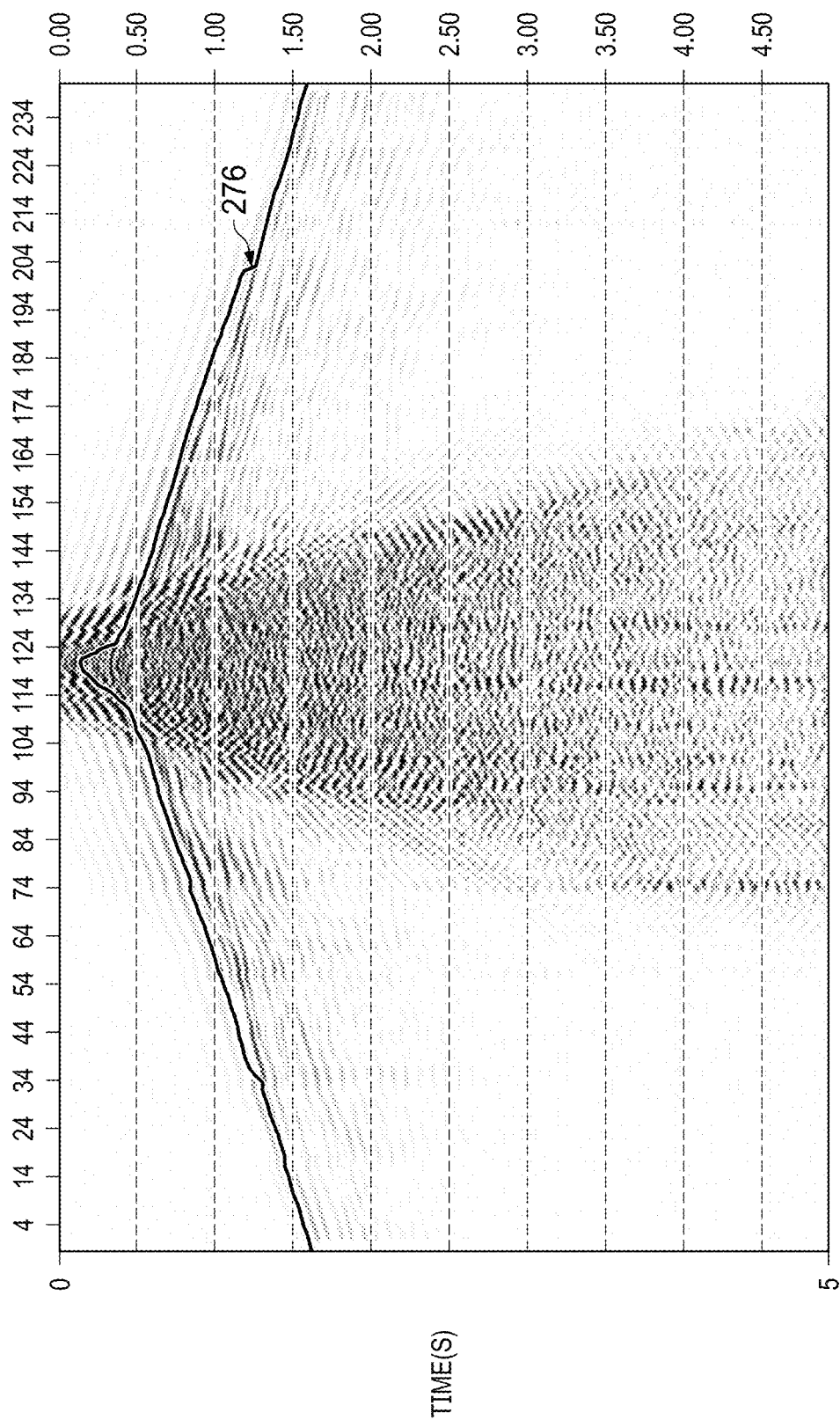
FIG. 6 shows an example graph illustrating auto-picking of first arrival travel times.

FIG. 6 shows an example graph 275 illustrating auto-picking of first arrival travel times. In the graph, line 276 represents the first arrival travel times for different locations in the subsurface. The first arrivals 276 are for a given seismic shot chosen by the automatic process previously described.

To avoid selection of incorrect travel times by the data processing system 270, the data processing system is configured to sort first arrival picks in the CMP-X, offset, and azimuth domain, shown in FIG. 2. In an example, for each pick, the data processing system 270 forms a hypercube, where the selected data are around the pick in the 4D domain using the hypercube as a window. A 4D median filter is applied to the picks inside the hypercube for removing outliers. In an example, for each selected travel time from the seismic data 262, a 4D window is generated by the data processing system 270 with apertures sized to extract other selected data (e.g., picks around the given travel time data) to form a hypercube in 4D domain. The picks (e.g., seismic shot data) in the hypercube are saved by the data processing system 270 in a data store. In some implementations, the selected data are saved as an array. The data processing system 270 applies the 4D filter to the array to find a median value for the array values. The data processing system 270 replaces the selected first arrival travel time of the seismic data 262 (e.g., the seismic shot) with the determined median value. The data processing system 270 repeats this process for each pick which originally comes from the automatic process previously described (e.g., using machine learning methods). The median filter is stable, and examples of quality-controlled first arrival travel times are shown in FIG. 7.

Figure 7:
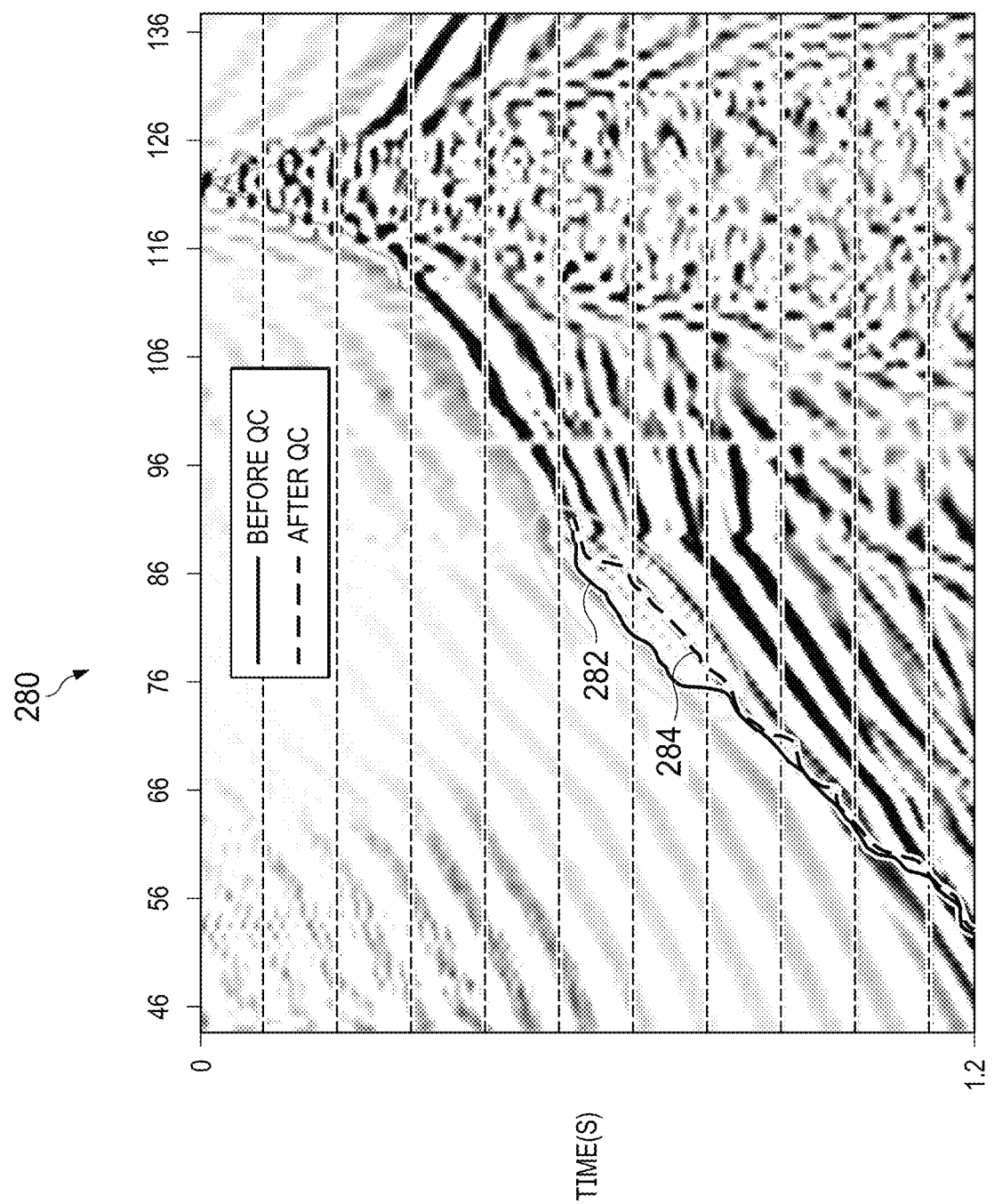
FIG. 7 shows a graph showing first arrival picks by the data processing system of FIG. 5.

FIG. 7 shows a graph 280 showing first arrival picks 282 and 284 by the data processing system 270. The pick 282 shows the value of the first travel times of the seismic shot before 4D median filtering as previously described. The pick 284 shows the value of the first travel times of the seismic shot after 4D median filtering as previously described. As shown in FIG. 7, the filtered signal 284 is shown which represents the filtered data that has been averaged inside the filter window. The result is a higher quality signal 284 relative to the unfiltered signal 282. The filtered signal 284 has stronger amplitude than the unfiltered signal 282. The filtered signal 284 also follows the trend of the adjacent signal, which is continuous and reliable.

In some implementations, the data processing system 270, when picking travel times from the seismic data (e.g., a seismic shot), is configured to rely on the maximum energy ratio with a moving window and weighted (or adjustable) threshold to automatically pick first arrivals. In some implementations, the continuous picks are observed in the new domain, and are ready for velocity inversion as previously described. This quality control process overcomes the challenge of reliable picking of data for seismic shots with a low SNR. This is in contrast to manual selection of the first arrival travel times in an interactive work flow.

FIG. 4C shows the process 240 for performing 1.5D inversion for the velocity model. The data processing system 270 obtains first arrival data (242) from the quality control module 264 after quality control has been performed as previously described. The process 240 includes an offset-weighted 1.5D inversion, in which lateral motion is a part of the determination of the inverse velocity model.

The 1.5D velocity inversion process 240 obtains a depth velocity for each common-midpoint (CMP) location in the subsurface region. In some implementations, the velocity model includes three layers. A linear velocity-depth function is generally applied in each layer. The structures in regions for the seismic imaging are generally regarded as layered media. In some implementations, the three-layer assumption in near surface agrees with the observations in the Middle East. A multi-layer model can be applied for other regions, including nonlinear velocity-depth functions for one or more layers. However the three-layer model is generally sufficient for accurate modeling and seismic imaging.

In some implementations, the data processing system 270 performs ray tracing (244) in the layered model to invert the velocity profiles for each layer. For example, the data processing system 270 (such as by the velocity inversion module 266 of FIG. 5) uses Snell's law and a solution to travel time in media with linear velocity-depth functions for a given shot to invert the velocity profiles in each layer. The velocity inversion module 266 of the data processing system 270 is configured to minimize a difference of the calculated travel times and the selected first arrival travel times for a given velocity range. In some implementations, the velocity range is about 500 meters per second (m/s) to about 6800 m/s, or some subset of those ranges. While values outside this range are possible, the range of 500 m/s to 6800 m/s represents a typical application.

An objective function is used by the data processing system 270 to determine the difference and determine (248) a velocity value for the shot location. The objective function J(v) for this calculation is $$J(v) = \frac{1}{2} \int_{\partial \Omega}^{\Omega} dr |T(v, r) - T_{obs}(r)|^2 \quad (1)$$

where T represents the calculated travel times by Baerg's method, and $T_{obs}$ is the picked first arrival travel times in the surface $\Omega$. Generally, v is the velocity in the subsurface media, and r is the observation position. The data processing system 270 is configured to solve this equation (246), generally through iterations. This represents a 1D inversion for the shot location, and the velocity profile is related to depth information and not lateral information.

To extend the velocity profile to 1.5D, the data processing system 270 determines offset weighting values (250) for the 1D velocity model. The data processing system 270 does this by determining the common midpoint (CMP) locations within the spreading range of the given shot. The offset-weighted factor for a CMP location in the current shot gather is $$w = \frac{curroffset \times (w_f - 1.0)}{maxoffset} + 1.0 \quad (2)$$

where curroffset is the offset distance corresponding to the CMP location, maxoffset is the maximum offset value in current shot gather, and $w_f$ is the user-defined weighting for the maximum offset, (e.g., $w_f$=0.01). This represents a semi-standard weighting. The appropriate range of $w_f$ is generally 0.0 to about 0.1. The value is selected to limit the effect of far-offset data. If the quality of data is poor, a smaller weighting factor is used by the data processing system 270. Generally, the offset-weighted factor represents the contribution of the current shot to the given CMP location. The weighted factor decreases as the offset of the CMP location increases.

The data processing system 270 determines the velocity profile (252) for a CMP location by Equation (3). This can be done using velocity model generation module 268 shown in FIG. 5 using $$v_{cmp} = \frac{\sum_{i=1}^{n} w_i v_i}{\sum_{i=1}^{n} w_i} \quad (3)$$

where $v_i$ is the velocity for the ith shot gather inverted by equation (1), $w_i$ is the offset-weighted factor of the CMP location from the ith shot gather computed with Equation (2). The velocity for the CMP location is the result of 1.5D inversion due to the considered lateral offset effect.

The process 240 extends 1D approaches in the shot domain or the CMP domain which do not consider lateral variations. In contrast to 1D approaches, the process 240 combines the data from both the shot domain and the CMP domain to perform the offset-weighted 1.5D inversion, which displays the lateral structures of near surface in local area.

Generally, the data processing system 270 combines both the shot domain and the CMP domain information to perform the weighted 1.5D inversion. The process 240 can be performed in a parallel computing environment which can include multi-core/multi-node CPU or GPU computers of the data processing system 270. The approach can handle large 3D datasets with better efficiency when parallelized. The approach 240 can be parallelized on different stages. In the stage of quality control, the first arrival picks are divided into blocks along the subline direction of the survey. Then these blocks are processed simultaneously in the 4D domain on multi-core/multi-node computers. In the stage of velocity inversion, the picks are sorted back to common shot domain. As each shot of picks are independent, the velocity inversion can be performed on the individual shot on multi-core/multi-node computers. After the velocity profiles are obtained in the shot domain, the offset-weighted 1.5D inversion would be carried out in the CMP domain using Equation (3Because the 3D datasets are often over 100 TB and need to be processed and inverted automatically within a short time, this approach can solve production-level usage challenges by this parallelization.

Returning to FIG. 4B, the data processing system 270 is configured to generate the velocity model (236) from the model data output of process 240. As the shot location continuously moves, a velocity section is generated with the offset-weighted technique of process 240. The velocity structure can be derived at any location where common shot gathers can be acquired. The process 240 can be applied easily to a dense-grid net of profiles to derive 3D models of p-wave velocity. Once the velocity model is generated, the data processing system 270 can generate seismic images (238) and store them as seismic image data 274 for downstream applications.

In an example, the process 240 was applied to a 2D land seismic dataset as shown in FIGS. 6-10. For example, most of first arrivals picked by the auto-picker are good enough for inversion, as previously described in relation to FIG. 6. As previously described, a few picks are not as good as expected, so the data processing system 270 applied the 4D median filter to the picks for the purpose of quality control. As previously described in relation to FIG. 7, the picks 284 after the quality control process were used in generating the velocity model.

Figure 8:
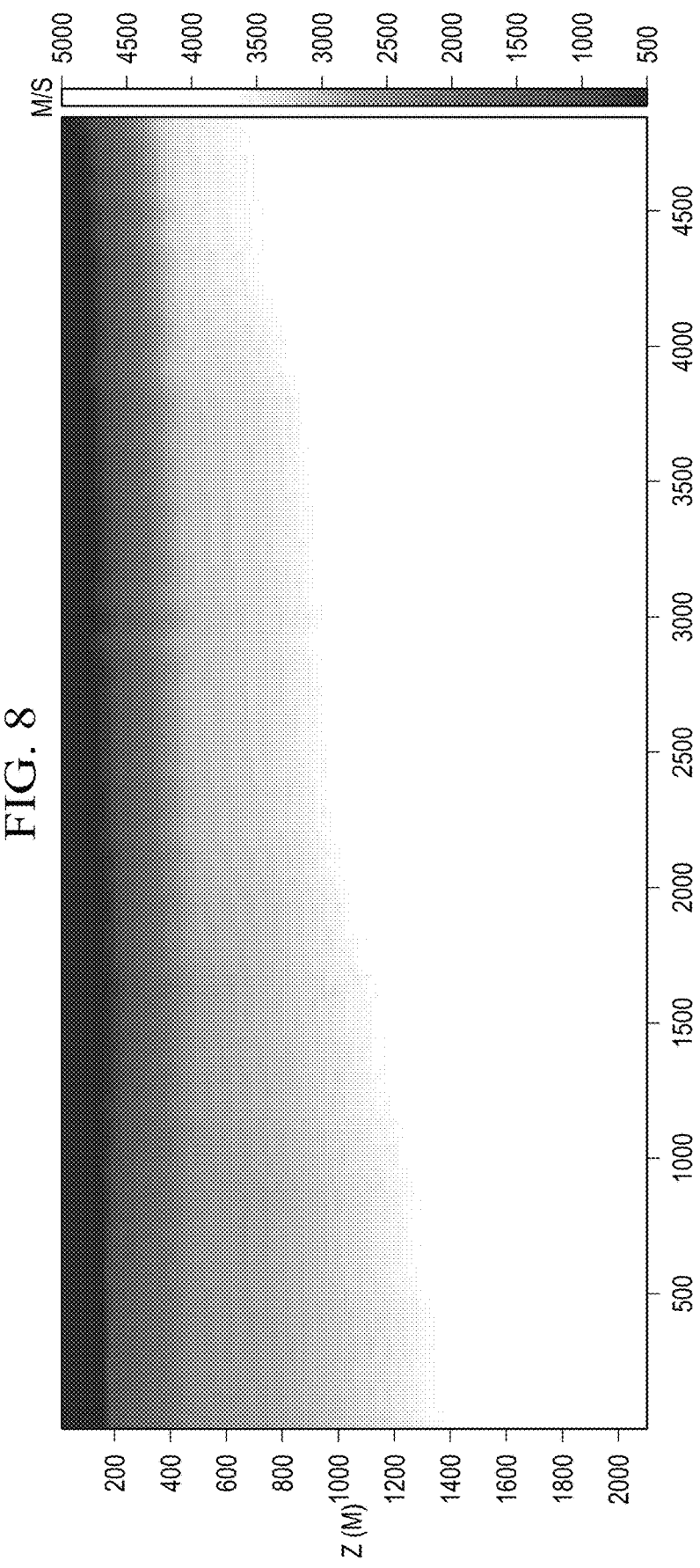
FIG. 8 shows an example velocity model.

FIG. 8 shows the resulting velocity model 290. After high-dimensional quality control (e.g., 4D quality control), the data processing system 270 performed process 240 to perform the 1.5D inversion. The data processing system 270 obtained the velocity profile at each CMP location. When all the velocity profiles were finished, a complete velocity model 290 was generated. There are some lateral variations in the inverted velocity section.

Figure 9:
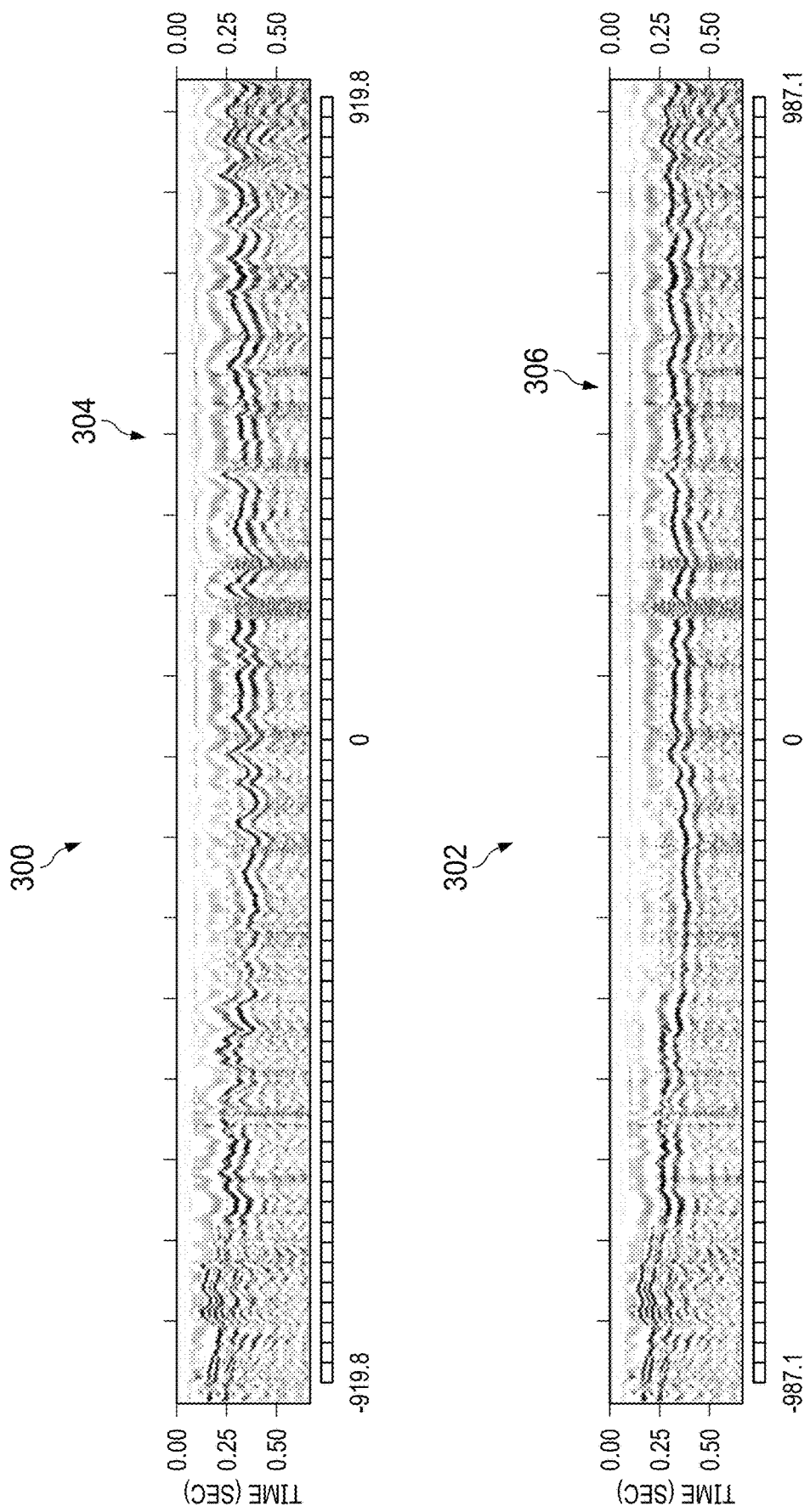
FIG. 9 shows examples of normal moveout (NMO) stacks.

FIG. 9 shows examples 300 and 302 of normal moveout (NMO) stacks. One of the applications with the inverted velocity is to compute datum statics for shot gathers. To check the effect of statics correction, the NMO stacking was performed (e.g., by data processing system 270). The NMO stack 302 after datum statics correction with the inverted velocity looks better than the stack 300 before statics correction in the shallow layer. The NMO stack 302 has less jitter along the lateral direction than the stack 300. This implies that the inverted velocity more accurately represents the subsurface structure. Weathering layers are shown at position 304 in the NMO stack 302 and position 306 in the NMO stack 302.

Figure 10A:
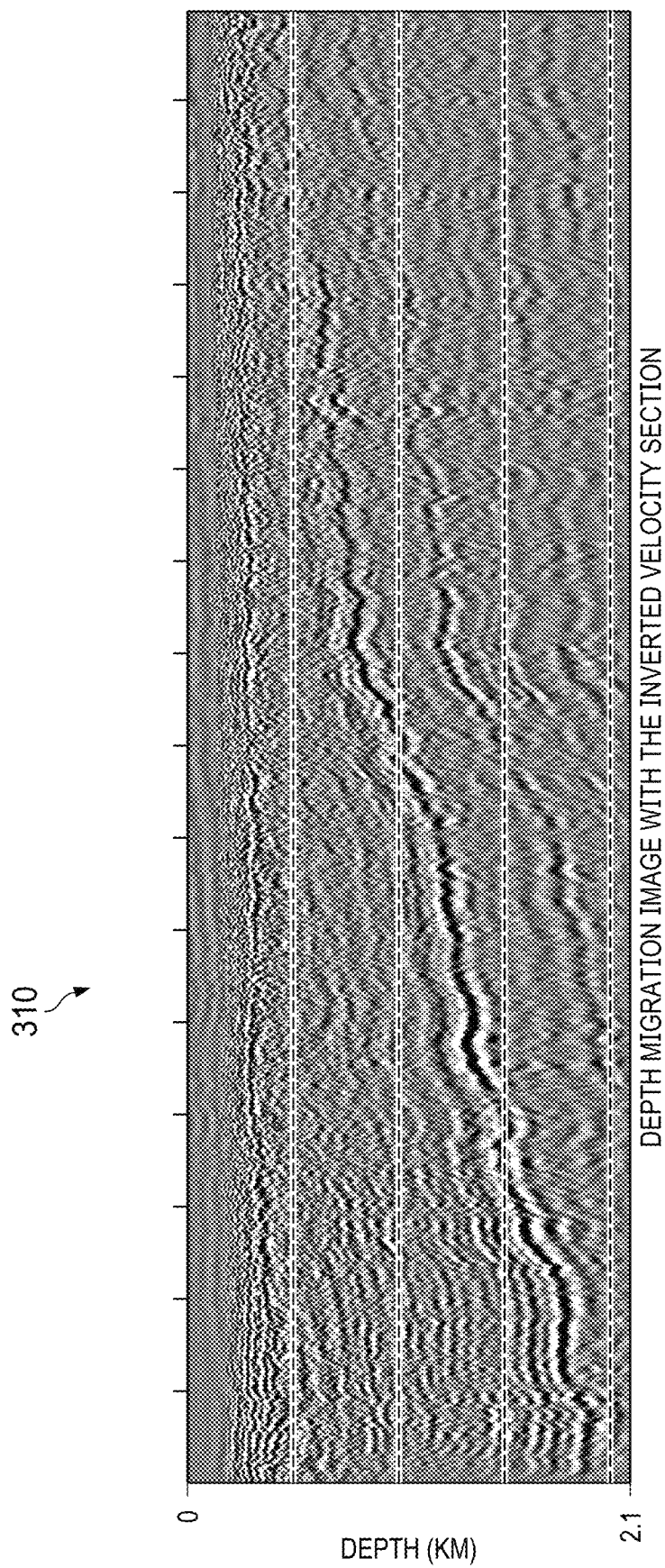
FIGS. 10A-10B shows a depth migration image with an inverted velocity section.
Figure 10B:
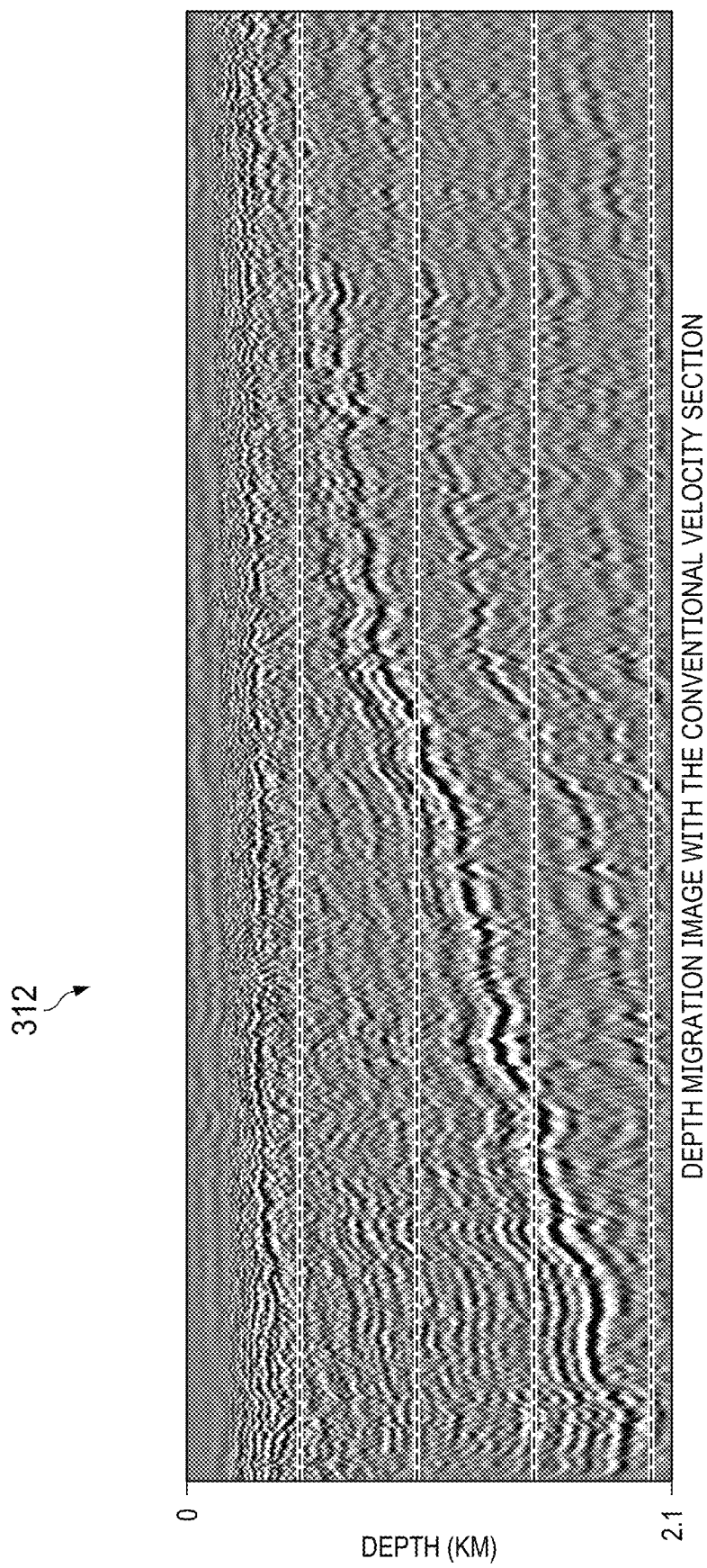

FIG. 10A shows a depth migration image 310 with an inverted velocity section. This is another application with the inverted velocity. The features in the depth migration image with the inverted velocity are more focused and continuous. For example, an image based on the conventional flow, shown in FIG. 10B at image 312, shows more jitter, especially on the events of dipping structure. This is obviously not a reasonable representation of the physical structure of the subterranean formation. The image 310 proves a more accurate representation.

Figure 11:
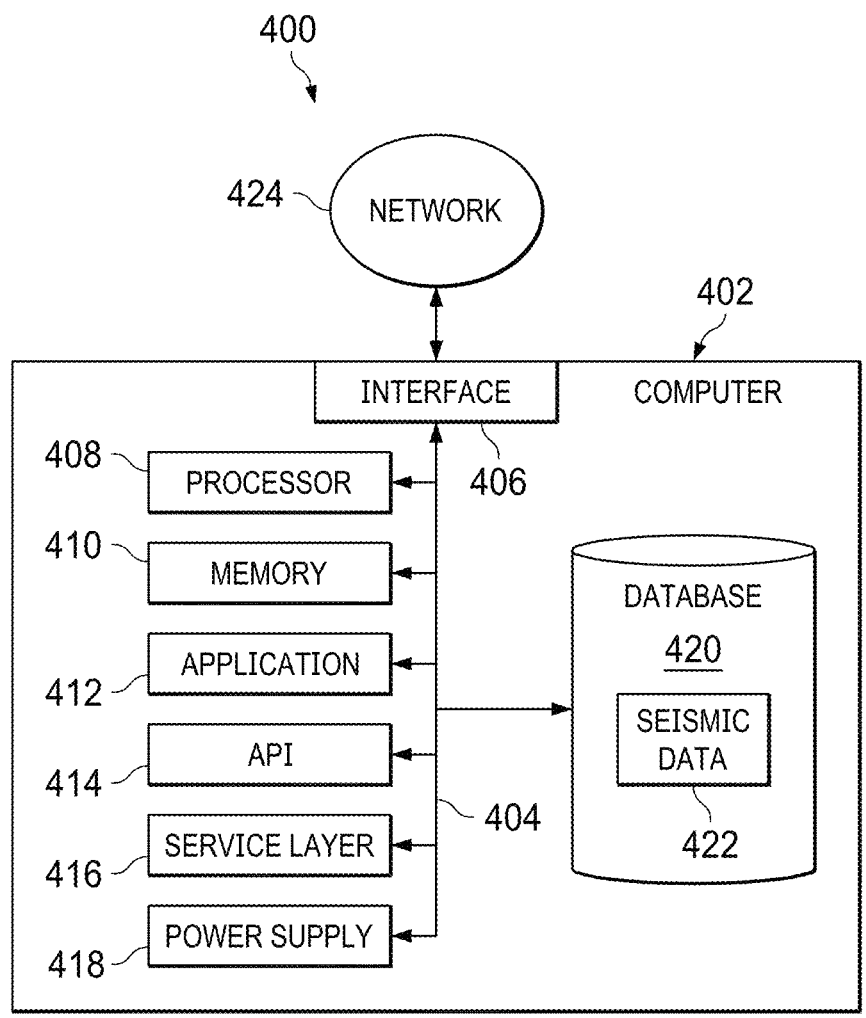
FIG. 11 is a diagram of an example computing system.

FIG. 11 is a block diagram of an example computing system 400 used to provide computational functionalities associated with described algorithms, methods, functions, processes, flows, and procedures described in the present disclosure, according to some implementations of the present disclosure. The illustrated computer 402 is intended to encompass any computing device such as a server, a desktop computer, a laptop/notebook computer, a wireless data port, a smart phone, a personal data assistant (PDA), a tablet computing device, or one or more processors within these devices, including physical instances, virtual instances, or both. The computer 402 can include input devices such as keypads, keyboards, and touch screens that can accept user information. Also, the computer 402 can include output devices that can convey information associated with the operation of the computer 402. The information can include digital data, visual data, audio information, or a combination of information. The information can be presented in a graphical user interface (UI) (or GUI).

The computer 402 can serve in a role as a client, a network component, a server, a database, a persistency, or components of a computer system for performing the subject matter described in the present disclosure. The illustrated computer 402 is communicably coupled with a network 424. In some implementations, one or more components of the computer 402 can be configured to operate within different environments, including cloud-computing-based environments, local environments, global environments, and combinations of environments.

At a high level, the computer 402 is an electronic computing device operable to receive, transmit, process, store, and manage data and information associated with the described subject matter. According to some implementations, the computer 402 can also include, or be communicably coupled with, an application server, an email server, a web server, a caching server, a streaming data server, or a combination of servers.

The computer 402 can receive requests over network 424 from a client application (for example, executing on another computer 402). The computer 402 can respond to the received requests by processing the received requests using software applications. Requests can also be sent to the computer 402 from internal users (for example, from a command console), external (or third) parties, automated applications, entities, individuals, systems, and computers.

Each of the components of the computer 402 can communicate using a system bus 404. In some implementations, any or all of the components of the computer 402, including hardware or software components, can interface with each other or the interface 406 (or a combination of both), over the system bus 404. Interfaces can use an application programming interface (API) 414, a service layer 416, or a combination of the API 414 and service layer 416. The API 414 can include specifications for routines, data structures, and object classes. The API 414 can be either computer-language independent or dependent. The API 414 can refer to a complete interface, a single function, or a set of APIs.

The service layer 416 can provide software services to the computer 402 and other components (whether illustrated or not) that are communicably coupled to the computer 402. The functionality of the computer 402 can be accessible for all service consumers using this service layer. Software services, such as those provided by the service layer 416, can provide reusable, defined functionalities through a defined interface. For example, the interface can be software written in JAVA, C++, or a language providing data in extensible markup language (XML) format. While illustrated as an integrated component of the computer 402, in alternative implementations, the API 414 or the service layer 416 can be stand-alone components in relation to other components of the computer 402 and other components communicably coupled to the computer 402. Moreover, any or all parts of the API 414 or the service layer 416 can be implemented as child or sub-modules of another software module, enterprise application, or hardware module without departing from the scope of the present disclosure.

The computer 402 includes an interface 406. Although illustrated as a single interface 406 in FIG. 11, two or more interfaces 406 can be used according to particular needs, desires, or particular implementations of the computer 402 and the described functionality. The interface 406 can be used by the computer 402 for communicating with other systems that are connected to the network 424 (whether illustrated or not) in a distributed environment. Generally, the interface 406 can include, or be implemented using, logic encoded in software or hardware (or a combination of software and hardware) operable to communicate with the network 424. More specifically, the interface 406 can include software supporting one or more communication protocols associated with communications. As such, the network 424 or the hardware of the interface can be operable to communicate physical signals within and outside of the illustrated computer 402.

The computer 402 includes a processor 408. Although illustrated as a single processor 408 in FIG. 11, two or more processors 408 can be used according to particular needs, desires, or particular implementations of the computer 402 and the described functionality. Generally, the processor 408 can execute instructions and can manipulate data to perform the operations of the computer 402, including operations using algorithms, methods, functions, processes, flows, and procedures as described in the present disclosure.

The computer 402 also includes a database 420 that can hold data (for example, seismic data 422) for the computer 402 and other components connected to the network 424 (whether illustrated or not). For example, database 420 can be an in-memory, conventional, or a database storing data consistent with the present disclosure. In some implementations, database 420 can be a combination of two or more different database types (for example, hybrid in-memory and conventional databases) according to particular needs, desires, or particular implementations of the computer 402 and the described functionality. Although illustrated as a single database 420 in FIG. 11, two or more databases (of the same, different, or combination of types) can be used according to particular needs, desires, or particular implementations of the computer 402 and the described functionality. While database 420 is illustrated as an internal component of the computer 402, in alternative implementations, database 420 can be external to the computer 402.

The computer 402 also includes a memory 410 that can hold data for the computer 402 or a combination of components connected to the network 424 (whether illustrated or not). Memory 410 can store any data consistent with the present disclosure. In some implementations, memory 410 can be a combination of two or more different types of memory (for example, a combination of semiconductor and magnetic storage) according to particular needs, desires, or particular implementations of the computer 402 and the described functionality. Although illustrated as a single memory 410 in FIG. 11, two or more memories 410 (of the same, different, or combination of types) can be used according to particular needs, desires, or particular implementations of the computer 402 and the described functionality. While memory 410 is illustrated as an internal component of the computer 402, in alternative implementations, memory 410 can be external to the computer 402.

The application 412 can be an algorithmic software engine providing functionality according to particular needs, desires, or particular implementations of the computer 402 and the described functionality. For example, application 412 can serve as one or more components, modules, or applications. Further, although illustrated as a single application 412, the application 412 can be implemented as multiple applications 412 on the computer 402. In addition, although illustrated as internal to the computer 402, in alternative implementations, the application 412 can be external to the computer 402.

The computer 402 can also include a power supply 418. The power supply 418 can include a rechargeable or non-rechargeable battery that can be configured to be either user- or non-user-replaceable. In some implementations, the power supply 418 can include power-conversion and management circuits, including recharging, standby, and power management functionalities. In some implementations, the power-supply 418 can include a power plug to allow the computer 402 to be plugged into a wall socket or a power source to, for example, power the computer 402 or recharge a rechargeable battery.

There can be any number of computers 402 associated with, or external to, a computer system containing computer 402, with each computer 402 communicating over network 424. Further, the terms "client," "user," and other appropriate terminology can be used interchangeably, as appropriate, without departing from the scope of the present disclosure. Moreover, the present disclosure contemplates that many users can use one computer 402 and one user can use multiple computers 402.

Implementations of the subject matter and the functional operations described in this specification can be implemented in digital electronic circuitry, in tangibly embodied computer software or firmware, in computer hardware, including the structures disclosed in this specification and their structural equivalents, or in combinations of one or more of them. Software implementations of the described subject matter can be implemented as one or more computer programs. Each computer program can include one or more modules of computer program instructions encoded on a tangible, non-transitory, computer-readable computer-storage medium for execution by, or to control the operation of, data processing apparatus. Alternatively, or additionally, the program instructions can be encoded in/on an artificially generated propagated signal. The example, the signal can be a machine-generated electrical, optical, or electromagnetic signal that is generated to encode information for transmission to suitable receiver apparatus for execution by a data processing apparatus. The computer-storage medium can be a machine-readable storage device, a machine-readable storage substrate, a random or serial access memory device, or a combination of computer-storage mediums.

The terms "data processing apparatus," "computer," and "electronic computer device" (or equivalent as understood by one of ordinary skill in the art) refer to data processing hardware. For example, a data processing apparatus can encompass all kinds of apparatus, devices, and machines for processing data, including by way of example, a programmable processor, a computer, or multiple processors or computers. The apparatus can also include special purpose logic circuitry including, for example, a central processing unit (CPU), a field programmable gate array (FPGA), or an application specific integrated circuit (ASIC). In some implementations, the data processing apparatus or special purpose logic circuitry (or a combination of the data processing apparatus or special purpose logic circuitry) can be hardware- or software-based (or a combination of both hardware- and software-based). The apparatus can optionally include code that creates an execution environment for computer programs, for example, code that constitutes processor firmware, a protocol stack, a database management system, an operating system, or a combination of execution environments. The present disclosure contemplates the use of data processing apparatuses with or without conventional operating systems, for example, LINUX, UNIX, WINDOWS, MAC OS, ANDROID, or IOS.

A computer program, which can also be referred to or described as a program, software, a software application, a module, a software module, a script, or code, can be written in any form of programming language. Programming languages can include, for example, compiled languages, interpreted languages, declarative languages, or procedural languages. Programs can be deployed in any form, including as stand-alone programs, modules, components, subroutines, or units for use in a computing environment. A computer program can, but need not, correspond to a file in a file system. A program can be stored in a portion of a file that holds other programs or data, for example, one or more scripts stored in a markup language document, in a single file dedicated to the program in question, or in multiple coordinated files storing one or more modules, sub programs, or portions of code. A computer program can be deployed for execution on one computer or on multiple computers that are located, for example, at one site or distributed across multiple sites that are interconnected by a communication network. While portions of the programs illustrated in the various figures may be shown as individual modules that implement the various features and functionality through various objects, methods, or processes, the programs can instead include a number of sub-modules, third-party services, components, and libraries. Conversely, the features and functionality of various components can be combined into single components as appropriate. Thresholds used to make computational determinations can be statically, dynamically, or both statically and dynamically determined.

The methods, processes, or logic flows described in this specification can be performed by one or more programmable computers executing one or more computer programs to perform functions by operating on input data and generating output. The methods, processes, or logic flows can also be performed by, and apparatus can also be implemented as, special purpose logic circuitry, for example, a CPU, an FPGA, or an ASIC.

Computers suitable for the execution of a computer program can be based on one or more of general and special purpose microprocessors and other kinds of CPUs. The elements of a computer are a CPU for performing or executing instructions and one or more memory devices for storing instructions and data. Generally, a CPU can receive instructions and data from (and write data to) a memory. A computer can also include, or be operatively coupled to, one or more mass storage devices for storing data. In some implementations, a computer can receive data from, and transfer data to, the mass storage devices including, for example, magnetic, magneto optical disks, or optical disks. Moreover, a computer can be embedded in another device, for example, a mobile telephone, a personal digital assistant (PDA), a mobile audio or video player, a game console, a global positioning system (GPS) receiver, or a portable storage device such as a universal serial bus (USB) flash drive.

Computer readable media (transitory or non-transitory, as appropriate) suitable for storing computer program instructions and data can include all forms of permanent/non-permanent and volatile/non-volatile memory, media, and memory devices. Computer readable media can include, for example, semiconductor memory devices such as random access memory (RAM), read only memory (ROM), phase change memory (PRAM), static random access memory (SRAM), dynamic random access memory (DRAM), erasable programmable read-only memory (EPROM), electrically erasable programmable read-only memory (EEPROM), and flash memory devices. Computer readable media can also include, for example, magnetic devices such as tape, cartridges, cassettes, and internal/removable disks. Computer readable media can also include magneto optical disks and optical memory devices and technologies including, for example, digital video disc (DVD), CD ROM, DVD+/−R, DVD-RAM, DVD-ROM, HD-DVD, and BLU-RAY. The memory can store various objects or data, including caches, classes, frameworks, applications, modules, backup data, jobs, web pages, web page templates, data structures, database tables, repositories, and dynamic information. Types of objects and data stored in memory can include parameters, variables, algorithms, instructions, rules, constraints, and references. Additionally, the memory can include logs, policies, security or access data, and reporting files. The processor and the memory can be supplemented by, or incorporated in, special purpose logic circuitry.

Implementations of the subject matter described in the present disclosure can be implemented on a computer having a display device for providing interaction with a user, including displaying information to (and receiving input from) the user. Types of display devices can include, for example, a cathode ray tube (CRT), a liquid crystal display (LCD), a light-emitting diode (LED), and a plasma monitor. Display devices can include a keyboard and pointing devices including, for example, a mouse, a trackball, or a trackpad. User input can also be provided to the computer through the use of a touchscreen, such as a tablet computer surface with pressure sensitivity or a multi-touch screen using capacitive or electric sensing. Other kinds of devices can be used to provide for interaction with a user, including to receive user feedback including, for example, sensory feedback including visual feedback, auditory feedback, or tactile feedback. Input from the user can be received in the form of acoustic, speech, or tactile input. In addition, a computer can interact with a user by sending documents to, and receiving documents from, a device that is used by the user. For example, the computer can send web pages to a web browser on a user's client device in response to requests received from the web browser.

The term "graphical user interface," or "GUI," can be used in the singular or the plural to describe one or more graphical user interfaces and each of the displays of a particular graphical user interface. Therefore, a GUI can represent any graphical user interface, including, but not limited to, a web browser, a touch screen, or a command line interface (CLI) that processes information and efficiently presents the information results to the user. In general, a GUI can include a plurality of user interface (UI) elements, some or all associated with a web browser, such as interactive fields, pull-down lists, and buttons. These and other UI elements can be related to or represent the functions of the web browser.

Implementations of the subject matter described in this specification can be implemented in a computing system that includes a back end component, for example, as a data server, or that includes a middleware component, for example, an application server. Moreover, the computing system can include a front-end component, for example, a client computer having one or both of a graphical user interface or a Web browser through which a user can interact with the computer. The components of the system can be interconnected by any form or medium of wireline or wireless digital data communication (or a combination of data communication) in a communication network. Examples of communication networks include a local area network (LAN), a radio access network (RAN), a metropolitan area network (MAN), a wide area network (WAN), Worldwide Interoperability for Microwave Access (WIMAX), a wireless local area network (WLAN) (for example, using 402.11 a/b/g/n or 402.20 or a combination of protocols), all or a portion of the Internet, or any other communication system or systems at one or more locations (or a combination of communication networks). The network can communicate with, for example, Internet Protocol (IP) packets, frame relay frames, asynchronous transfer mode (ATM) cells, voice, video, data, or a combination of communication types between network addresses.

The computing system can include clients and servers. A client and server can generally be remote from each other and can typically interact through a communication network. The relationship of client and server can arise by virtue of computer programs running on the respective computers and having a client-server relationship.

Cluster file systems can be any file system type accessible from multiple servers for read and update. Locking or consistency tracking may not be necessary since the locking of exchange file system can be done at application layer. Furthermore, Unicode data files can be different from non-Unicode data files.

While this specification contains many specific implementation details, these should not be construed as limitations on the scope of what may be claimed, but rather as descriptions of features that may be specific to particular implementations. Certain features that are described in this specification in the context of separate implementations can also be implemented, in combination, in a single implementation. Conversely, various features that are described in the context of a single implementation can also be implemented in multiple implementations, separately, or in any suitable sub-combination. Moreover, although previously described features may be described as acting in certain combinations and even initially claimed as such, one or more features from a claimed combination can, in some cases, be excised from the combination, and the claimed combination may be directed to a sub-combination or variation of a sub-combination.

Particular implementations of the subject matter have been described. Other implementations, alterations, and permutations of the described implementations are within the scope of the following claims as will be apparent to those skilled in the art. While operations are depicted in the drawings or claims in a particular order, this should not be understood as requiring that such operations be performed in the particular order shown or in sequential order, or that all illustrated operations be performed (some operations may be considered optional), to achieve desirable results. In certain circumstances, multitasking or parallel processing (or a combination of multitasking and parallel processing) may be advantageous and performed as deemed appropriate.

Moreover, the separation or integration of various system modules and components in the previously described implementations should not be understood as requiring such separation or integration in all implementations, and it should be understood that the described program components and systems can generally be integrated together in a single software product or packaged into multiple software products.

Accordingly, the previously described example implementations do not define or constrain the present disclosure. Other changes, substitutions, and alterations are also possible without departing from the spirit and scope of the present disclosure.

Furthermore, any claimed implementation is considered to be applicable to at least a computer-implemented method; a non-transitory, computer-readable medium storing computer-readable instructions to perform the computer-implemented method; and a computer system comprising a computer memory interoperably coupled with a hardware processor configured to perform the computer-implemented method or the instructions stored on the non-transitory, computer-readable medium.

While this specification contains many details, these should not be construed as limitations on the scope of what may be claimed, but rather as descriptions of features specific to particular examples. Certain features that are described in this specification in the context of separate implementations can also be combined. Conversely, various features that are described in the context of a single implementation can also be implemented in multiple embodiments separately or in any suitable sub-combination.

A number of embodiments have been described. Nevertheless, it will be understood that various modifications may be made without departing from the spirit and scope of the data processing system described herein. Accordingly, other embodiments are within the scope of the following claims.

What is claimed is:

1. A method for building a three dimensional (3D) model of a subsurface formation, the method comprising:
    selecting, from a set of seismic shots, a plurality of first arrival signals representing the seismic shots;
    applying a quality control function to the plurality of first arrival signals to obtain a set of remaining first arrival signals; and
    for each remaining first arrival signals:
        applying a velocity inversion function to obtain a depth velocity value at a common-midpoint (CMP) location in a shot gather including a seismic shot associated with that remaining first arrival signal, the CMP location representing a lateral variation of the shot gather including that seismic shot; and
        based on the depth velocity value for the seismic shot associated with each remaining first arrival signal, generating a velocity model representing the 3D model of the subsurface formation.

2. The method of claim 1, wherein selecting the plurality of first arrival signals comprises:
    determining, for each first arrival signal of the plurality of first arrival signals, an energy ratio value;
    determining a particular energy ratio value that is a global maximum energy ratio value; and
    selecting a first arrival signal associated with the global maximum energy ratio value.

3. The method of claim 1, wherein applying the quality control function comprises:
    sorting the plurality of first arrival signals representing the seismic shots in a four dimensional (4D) domain; and
    for each first arrival signal:
        applying a hypercube window centered on that first arrival signal to extract other first arrival signals in the 4D domain, the other first arrival signals being inside the hypercube window;
        determining a median value of the first arrival signal and the other first arrival signal; and
        storing the median value for representing the first arrival signal.

4. The method of claim 1, wherein the velocity inversion function is applied to at least two first arrival signals of the plurality of first arrival signals in parallel.

5. The method of claim 4, wherein a processing time for parallel processing of the velocity inversion function is reduced by at least 90% relative to a processing time for non-parallel processing of the velocity inversion function.

6. The method of claim 1, wherein applying the velocity inversion function further comprises:
    applying a weighting function to each remaining first arrival signal representing a contribution of that remaining first arrival signal to the CMP location.

7. The method of claim 1, further comprising:
    based on the velocity model representing the 3D model of the subsurface formation, performing datum statics correction for the shot gather; and
    based on the datum statics correction, performing a normal moveout (NMO) stacking for the shot gather.

8. A system for building a three dimensional (3D) model of a subsurface formation, the system comprising:
    at least one processing device; and
    a memory storing instructions that when executed by the at least one processing device cause the at least one processing device to perform operations comprising:
        selecting, from a set of seismic shots, a plurality of first arrival signals representing the seismic shots;
        applying a quality control function to the plurality of first arrival signals to obtain a set of remaining first arrival signals; and
        for each remaining first arrival signals:
            applying a velocity inversion function to obtain a depth velocity value at a common-midpoint (CMP) location in a shot gather including the seismic shot associated with that remaining first arrival signal, the CMP location representing a lateral variation of the shot gather including that seismic shot; and
            based on the depth velocity value for the seismic shot associated with each remaining first arrival signal, generating a velocity model representing the 3D model of the subsurface formation.

9. The system of claim 8, wherein selecting the plurality of first arrival signals comprises:
    determining, for each first arrival signal of the plurality of first arrival signals, an energy ratio value;
    determining a particular energy ratio value that is a global maximum energy ratio value; and
    selecting a first arrival signal associated with the global maximum energy ratio value.

10. The system of claim 8, wherein applying the quality control function comprises:
    sorting the plurality of first arrival signals representing the seismic shots in a four dimensional (4D) domain; and
    for each first arrival signal:
        applying a hypercube window centered on that first arrival signal to extract other first arrival signals in the 4D domain, the other first arrival signals being inside the hypercube window;
        determining a median value of the first arrival signal and the other first arrival signal; and
        storing the median value for representing the first arrival signal.

11. The system of claim 8, wherein the velocity inversion function is applied to at least two first arrival signals of the plurality of first arrival signals in parallel.

12. The system of claim 11, wherein a processing time for parallel processing of the velocity inversion function is reduced by at least 90% relative to a processing time for non-parallel processing of the velocity inversion function.

13. The system of claim 8, wherein applying the velocity inversion function further comprises:
applying a weighting function to each remaining first arrival signal representing a contribution of that remaining first arrival signal to the CMP location.

14. The system of claim 8, the operations further comprising:
based on the velocity model representing the 3D model of the subsurface formation, performing datum statics correction for the shot gather; and
based on the datum statics correction, performing a normal moveout (NMO) stacking for the shot gather.

15. One or more non-transitory computer readable media storing instructions for building a three dimensional (3D) model of a subsurface formation, wherein the instructions are configured for execution by at least one processing device to cause the at least one processing device to perform operations comprising:
selecting, from a set of seismic shots, a plurality of first arrival signals representing the seismic shots;
applying a quality control function to the plurality of first arrival signals to obtain a set of remaining first arrival signals; and
for each remaining first arrival signals:
applying a velocity inversion function to obtain a depth velocity value at a common-midpoint (CMP) location in a shot gather including the seismic shot associated with that remaining first arrival signal, the CMP location representing a lateral variation of the shot gather including that seismic shot; and
based on the depth velocity value for the seismic shot associated with each remaining first arrival signal, generating a velocity model representing the 3D model of the subsurface formation.

16. The one or more non-transitory computer readable media of claim 15, wherein selecting the plurality of first arrival signals comprises:
determining, for each first arrival signal of the plurality of first arrival signals, an energy ratio value;
determining a particular energy ratio value that is a global maximum energy ratio value; and
selecting a first arrival signal associated with the global maximum energy ratio value.

17. The one or more non-transitory computer readable media of claim 15, wherein applying the quality control function comprises:
sorting the plurality of first arrival signals representing the seismic shots in a four dimensional (4D) domain; and
for each first arrival signal:
applying a hypercube window centered on that first arrival signal to extract other first arrival signals in the 4D domain, the other first arrival signals being inside the hypercube window;
determining a median value of the first arrival signal and the other first arrival signal; and
storing the median value for representing the first arrival signal.

18. The one or more non-transitory computer readable media of claim 15, wherein the velocity inversion function is applied to at least two first arrival signals of the plurality of first arrival signals in parallel.

19. The one or more non-transitory computer readable media of claim 18, wherein a processing time for parallel processing of the velocity inversion function is reduced by at least 90% relative to a processing time for non-parallel processing of the velocity inversion function.

20. The one or more non-transitory computer readable media of claim 15, wherein applying the velocity inversion function further comprises:
applying a weighting function to each remaining first arrival signal representing a contribution of that remaining first arrival signal to the CMP location.

* * * * *